July 16, 1935.  H. A. KNOX  2,008,214
ENDLESS TRACK FOR VEHICLES
Filed Jan. 24, 1933   2 Sheets-Sheet 1
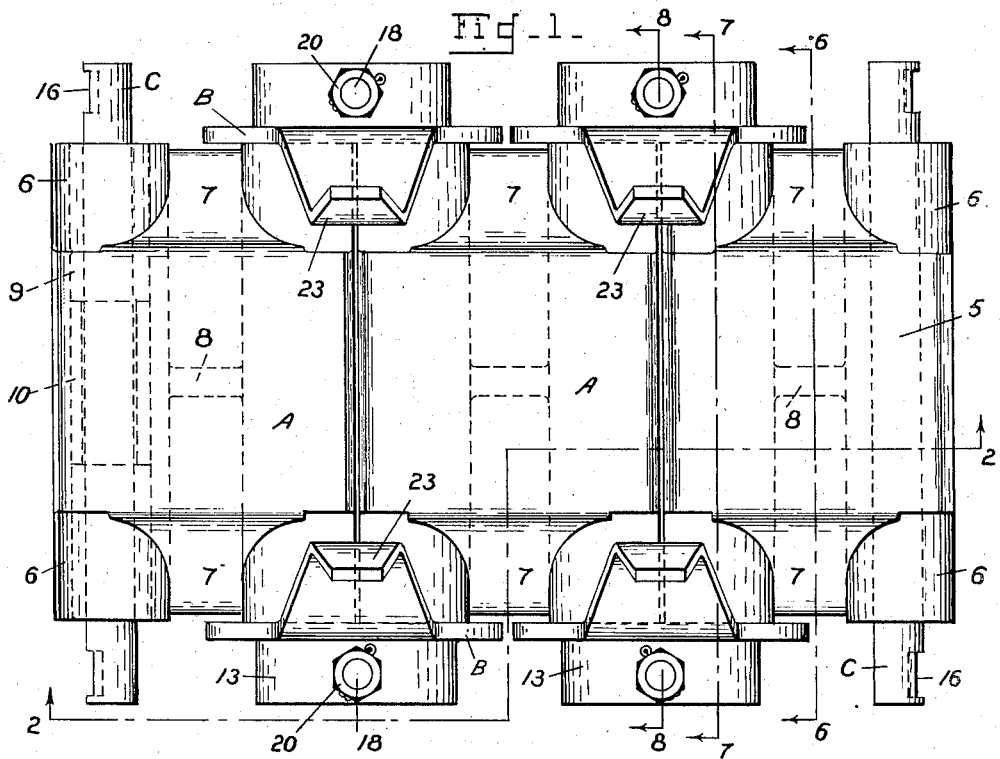
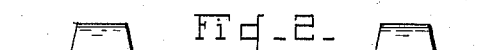
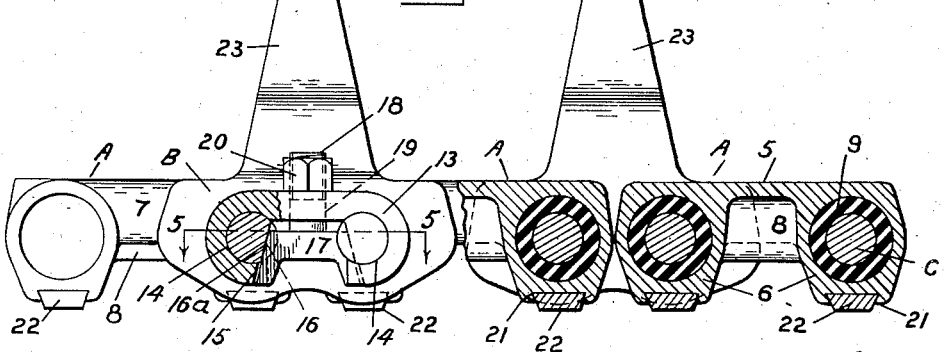
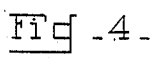
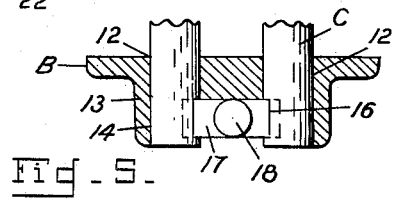
Inventor
Harry A. Knox
By W. N. Roach
Attorney July 16, 1935.  H. A. KNOX  2,008,214
ENDLESS TRACK FOR VEHICLES
Filed Jan. 24, 1933  2 Sheets-Sheet 2
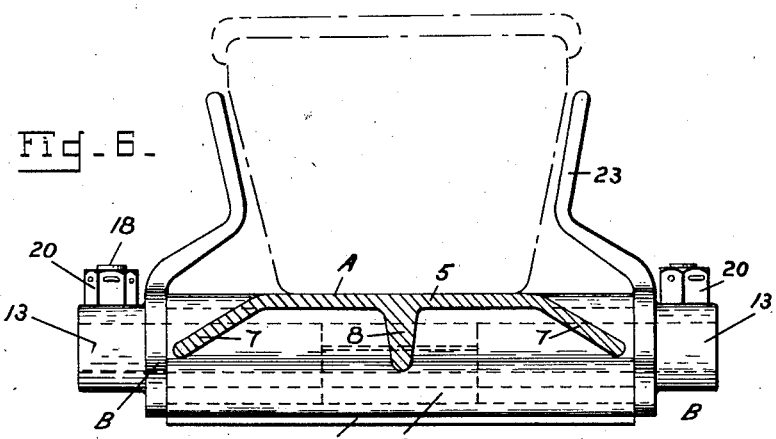
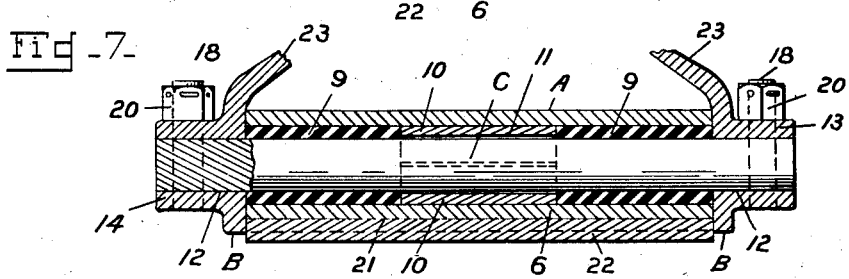
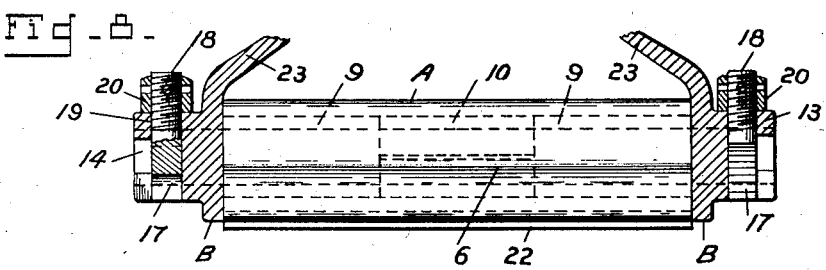
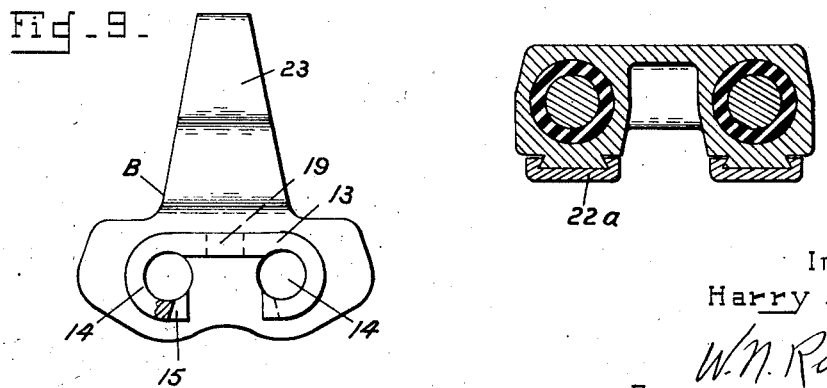
Inventor
Harry A. Knox
By W. N. Roach
Attorney Patented July 16, 1935

2,008,214

UNITED STATES PATENT OFFICE 2,008,214

ENDLESS TRACK FOR VEHICLES

Harry A. Knox, Davenport, Iowa

Application January 24, 1933, Serial No. 653,307

10 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an endless track for vehicles and is particularly adapted for association with rubber tires in converting a wheeled vehicle into a track-laying vehicle.

Since a track of this character forms a part of the load of the vehicle when not in use, it is especially important that it must be of minimum weight and maximum strength and must also be capable of being rapidly mounted and dismounted. With these requirements in view the track forming the subject of the present invention is characterized by a novel form of grouser or shoe having removable cleats held in place by the the links connecting the grousers. The links holding the adjoining link pins against independent rotation include wheel guides and are secured and attached in a novel manner.

The track is further distinguished by a link pin having deformable rubber bushings that are employed in combination with a metal bushing that serves to limit deformation of the rubber.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is an inside plan view of a portion of the improved track.

Fig. 2 is a view in side elevation of Fig. 1 with parts in section on the line 2—2 of Fig. 1.

Fig. 3 is a view in side elevation of the bolt.

Fig. 4 is a plan view of Fig. 3.

Fig. 5 is a sectional view on the line 5—5 of Fig. 2.

Figs. 6, 7 and 8 are sectional views on the respective lines of Fig. 1.

Fig. 9 is a detail view in side elevation of the link.

Fig. 10 is a view in side elevation of a section of a modified form of cleat.

Referring to the drawings by characters of reference:

The track comprises a series of grousers or shoes A connected in spaced relation by links B mounted on link pins C.

The shoes are all identical and each one consists of a body 5 forming a flat rail surface for the wheels of the vehicle and joining a pair of spaced bearings 6—6 extending transversely of the track. The side portions 7 of the body are inclined towards the median line of the spaced bearings (Fig. 6) with which they are integral and for which they constitute strengthening webs while at the same time they cooperate with the bearings in forming a trough that facilitates clearing the rail surface of mud. One or more longitudinally disposed webs 8 on the ground side of the body 5 similarly support the bearings along the center line of the track.

The link pins C mounted in the bearings 6 are provided with one or more rubber bushings 9 (Figs. 2 and 7) preferably vulcanized thereto and press-fitted in the bearings. Metal bushings 10, which are split when positioned between the rubber as shown, have a close fit in the bearing and an appreciable clearance 11 relative to the link pin. As clearly shown in Fig. 7 the link pin is movable radially of the bearing due to the deformability of the rubber bushing but this radial movement is limited to the value of the clearance 11.

The link pins C are of sufficient length to project from opposite ends of the bearings 6 as clearly indicated in Fig. 1. The links B have spaced apertures 12—12 (Fig. 5) for receiving the projecting ends of the adjoining pins of adjoining shoes. On the outer side of each of the links is a laterally projecting flange 13 which preferably has its ends turned to provide three-quarter bearings 14—14 (Fig. 2) for partially embracing the link pins, thereby protecting the ends of the pins and increasing the bearing surfaces of the links. The flanges 13. with their turned ends 14 projecting laterally ( the track also provide driving lugs engageable by the teeth of the usual sprocket wheel, not shown. The free end of each of the three-quarter bearings 14 is provided with a slot 15 adapted to be aligned with a tangential slot 16 formed adjacent each end of the link pins C.

A bolt insertable in the opening between the slots 15 in the bearings 14 has a wedge-shaped head 17 adapted to bear against the walls 16a of the slots 16 in the link pins. The shank 18 of the bolt is inserted through an aperture 19 in the flange 13 and a nut 20 is applied thereto until it bears against the flange. The wedge-shaped head 17 is thereby drawn tight against the walls 16a of the link pins C and the associated link pins are securely locked against independent rotational movement. By virtue of this arrangement the flection of a shoe relative to its link pin or to an adjoining shoe must be taken through the rubber bushings 9 which have a capacity of distorting to permit an angular movement of 25 degrees. The engagement of the metal portions of the link pins C with the metal bearings 12 and 14 of the links B are thereby restricted to a straight pull without any relative rotational movement which would result in rapid wear. The arrangement also serves to hold the links B in place on the link pins C and provides a quick detachable coupling for adjoining shoes.

The adjoining shoes of the track are assembled at an angle of 7 to 8 degrees which is one-half the total angle of flection in passing around the wheels of the vehicle.

The links B are also formed with lugs or restraining surfaces 21—21 adapted to extend over the ends of the bearings 6 and laterally confine cleats or wearing plates 22 mounted by means of a tongue and groove arrangement on the tread side of the bearings 6. The wearing plates are readily removable and may be quickly replaced. In the modification shown in Fig. 10 the wearing plates 22a are also mounted through a tongue and groove arrangement but are wider.

As clearly seen in Fig. 6 each of the links B is formed with an upstanding wheel guide 23. The guides are turned in towards the center of the track so that they will not interfere with sprocket teeth (not shown) adapted to be engaged between the ends of the three-quarter bearings 14 of adjoining links B.

The only operation involved in assembling the track is to mount the links B on the link pins and apply the wedge-shaped bolt.

I claim:

1. In a track for track-laying vehicles, a series of spaced shoes, each shoe comprising a body joining a pair of bearings extending transversely of the track, a link pin inserted through each bearing, rubber bushings fast on each pin and engaging the bearing, a metal bushing loose on each pin and fitting the bearing, links mounted on the ends of adjoining pins of adjoining shoes, and means for holding the links in place and holding the link pins against independent rotational movement.

2. In a track for track-laying vehicles, a series of spaced shoes, each shoe comprising a body joining a pair of bearings extending transversely of the track, a link pin inserted through each bearing, rubber bushings fast on each pin and engaging the bearing, a metal bushing loose on each pin and fitting the bearing, links mounted on the ends of adjoining pins of adjoining shoes, and means carried by the links and engaging the pins for holding the link pins against independent rotational movement.

3. In a track for track-laying vehicles, a series of spaced shoes, each shoe comprising a body joining a pair of bearings extending transversely of the track, a link pin inserted through each bearing, rubber bushings fast on each pin and engaging the bearing, links mounted on the ends of adjoining pins of adjoining shoes, and an adjustable member carried by each link for holding the link pins against independent rotational movement.

4. In a track for track-laying vehicles, a series of spaced shoes having bearings, a link pin inserted through each bearing and having a tangential slot adjacent its ends, links mounted on the ends of adjoining pins of adjoining shoes, a flange on each link projecting laterally relative to the track, partial bearings on the flange and engaging the link pins, said partial bearings constituting driving lugs, a bolt having a wedge-shaped head engageable in the slots of associated link pins and having a shank insertable through the flange, and a nut on the shank bearing against the flange and drawing the head into contact with the link pins.

5. In a track for track-laying vehicles, a series of spaced shoes having bearings, a link pin insertable through each bearing and having a tangential slot adjacent each of its ends, links mounted on the ends of adjoining pins of adjoining shoes, a flange on each link projecting laterally relative to the track, partial bearings on the flange and engaging the link pins, a bolt having a wedge-shaped head engageable in the slots of associated link pins and having a shank insertable through the flange, and a nut on the shank bearing against the flange and drawing the head into contact with the link pins.

6. In a track for track-laying vehicles, a series of spaced shoes having bearings, link pins inserted through the bearings and each having a tangential slot adjacent each of its ends, links mounted on the ends of adjoining pins of adjoining shoes, a flange on each link projecting laterally relative to the track, a bolt having a wedge-shaped head engageable in the slots of associated link pins and having a shank insertable through the flange, and a nut on the shank bearing against the flange and drawing the head into contact with the link pins.

7. In a track for track-laying vehicles, a series of spaced shoes having bearings, a wearing plate on each bearing and having a tongue and groove connection therewith, a link pin insertable through each bearing, links mounted on the ends of adjoining pins of adjoining shoes, and laterally confining the wearing plates of associated bearings, and means for retaining the links on the link pins.

8. In a track for track-laying vehicles, a series of spaced shoes having bearings, a wearing plate on each bearing and having a sliding connection therewith, a link pin insertable through each bearing, and links mounted at the ends of adjoining pins of adjoining shoes and confining the wearing plates against sliding movement.

9. In a track for track-laying vehicles, a series of spaced shoes having bearings extending transversely of the track, a link pin inserted through each bearing, a rubber bushing engaging the link pin and bearing, links connecting adjoining pins of adjoining shoes, and means carried by the links and engaging the pins for holding the link pins against independent rotational movement.

10. In a track for track-laying vehicles, a series of spaced shoes having bearings, a link pin inserted through each bearing, a rubber bushing vulcanized on the link pin and press-fitted in the bearing, links connecting adjoining pins of adjoining shoes, and means carried by the links and engaging the pins for holding the pins against independent rotational movement.

HARRY A. KNOX.